Sept. 22, 1925.  1,554,571
C. H. GENTEL
COCONUT SHREDDING MACHINE
Filed July 10, 1924   6 Sheets-Sheet 1

Fig. 1.

INVENTOR
Charles Gentel
BY
Pennie, Davis, Marvin & Edmonds
his ATTORNEYS

C. H. GENTEL 1,554,571

COCONUT SHREDDING MACHINE

Filed July 10, 1924   6 Sheets-Sheet 4

Sept. 22, 1925.  
C. H. GENTEL  
COCONUT SHREDDING MACHINE  
Filed July 10, 1924  
1,554,571  
6 Sheets-Sheet 6

Patented Sept. 22, 1925.

1,554,571

UNITED STATES PATENT OFFICE.

CHARLES H. GENTEL, OF BROOKLYN, NEW YORK, ASSIGNOR TO THE HILLS BROTHERS COMPANY, A CORPORATION OF NEW YORK.

COCONUT-SHREDDING MACHINE.

Application filed July 10, 1924. Serial No. 725,178.

*To all whom it may concern:*

Be it known that I, CHARLES H. GENTEL, a citizen of the United States, residing at Brooklyn, in the county of Kings, State of New York, have invented certain new and useful Improvements in Coconut-Shredding Machines; and I do hereby declare the following to be a full, clear, and exact description of the invention, such as will enable others skilled in the art to which it appertains to make and use the same.

This invention relates to machines for extracting meat from coconuts, and delivering it in the form of shreds of a size and shape suitable for commercial distribution. In such machines a part of a coconut having an open end is held by suitable gripping devices, and the meat within the shell subjected to the action of the shredding tool. For this purpose the nut and the tool are given a relative movement of rotation and a relative movement of translation, and the two movements are so coordinated that the cutting end of the tool, following a spiral path with relation to the nutshell, gradually attacks all portions of the meat contained therein and delivers the meat in the form of shreds. These machines as used heretofore, require that the operator shall insert each new nut in place in the holder, move the tool to proper position so that it can act on the nut, and then connect the power driven devices with the source of power, as, for instance, by means of a clutch. During the shredding operation, the operator must give his attention to the machine so that he may stop the machine when all the meat has been removed from the shell. The control of the machine is, therefore, wholly manual, and the operator must have a considerable degree of skill in order that the machine may produce the maximum output.

The machine of the present invention is designed to avoid these disadvantages and it includes appropriate mechanism for bringing the extracting operation to a stop at any predetermined point, preferably when the entire contents of the shell have been removed. For this purpose, the machine includes a holder for a portion of a nut, a tool by which the meat is extracted, power driven devices by which the nut holder and the tool may be given a relative movement of rotation and a relative movement of translation, and mechanism for stopping the relative movement of translation at any selected point. To this end the curvature of the inner wall of the shell is taken advantage of, and in this machine the first relative movement is carried on preferably by rotating the nut holder while the tool remains in a relatively fixed position, and the second movement by causing the tool to advance into the open end of the nut held in the nut holder. The tool is held in a device which permits it to bear against the inner wall of the shell with a yielding pressure, and as it moves into the nut while the latter is rotating, the cutting knives attack the meat along a spiral path. The portion of the nut which is acted on is preferably half a coconut, produced by a transverse cut, and as the tool follows its curved inner wall, it swings about an axis. The mechanism by which the relative movement of translation of the nut and the tool is produced includes a clutch of appropriate form and when the tool has been swung in the manner described, to a selected position, it actuates a latch device associated with the clutch mechanism so as to throw out the clutch. With such an arrangement the amount of skill required on the part of the operator is a minimum, and no injury can result to the machine from a lack of attention on his part. The machine also includes a suitable device by which a half nut may be quickly inserted in the gripping devices, and also convenient means for delivering the extracted meat. The several power driven devices are so designed that the operation of inserting and centering the nut in its holder, and of bringing the tool into operative relation thereto may be carried on rapidly and without expert manipulation. The invention, therefore, provides a machine in which the extracting of the meat from the shell may be carried on practically automatically, and while this extracting operation is taking place the operator puts a new portion of a nut in the inserting device so that when the contents have been removed from one nutshell a new one may be placed in the machine and the machine started with but small delay.

In the accompanying drawings I have illustrated that embodiment of the machine which is now preferred, and in these drawings.

Referring now to these drawings, the machine is shown as mounted on a bed plate 11, part of the mechanism being mounted on a table 12, supported above the bed plate at any convenient height on legs 13. Mounted in suitable bearings in the table 12 and in the supporting members therefor, is a vertical shaft 14 which carries a bevel gear 15 beneath the table. Encircling the shaft below the bevel gear is a plate 16 having a hub 17 through which the shaft extends, and mounted on this plate is a bearing 18 for a horizontal shaft 19, this shaft carrying a bevel gear 20 meshing with the gear 15. With this arrangement the shaft 19 is driven from the shaft 14 and the shaft 19 is capable of being swung about the shaft 14 while retaining the driving connection therewith. At its upper end above the table 12, the shaft 14 carries a bevel gear 21, which, in turn, meshes with a bevel gear 22 on a shaft 23, one end of which is journaled in a bracket 24 of suitable form bolted to the top of the table, the other end being supported in a similar bearing 25, provided with a cap 26 bolted thereto and holding the shaft 23 firmly in position.

Figures 4, 5:
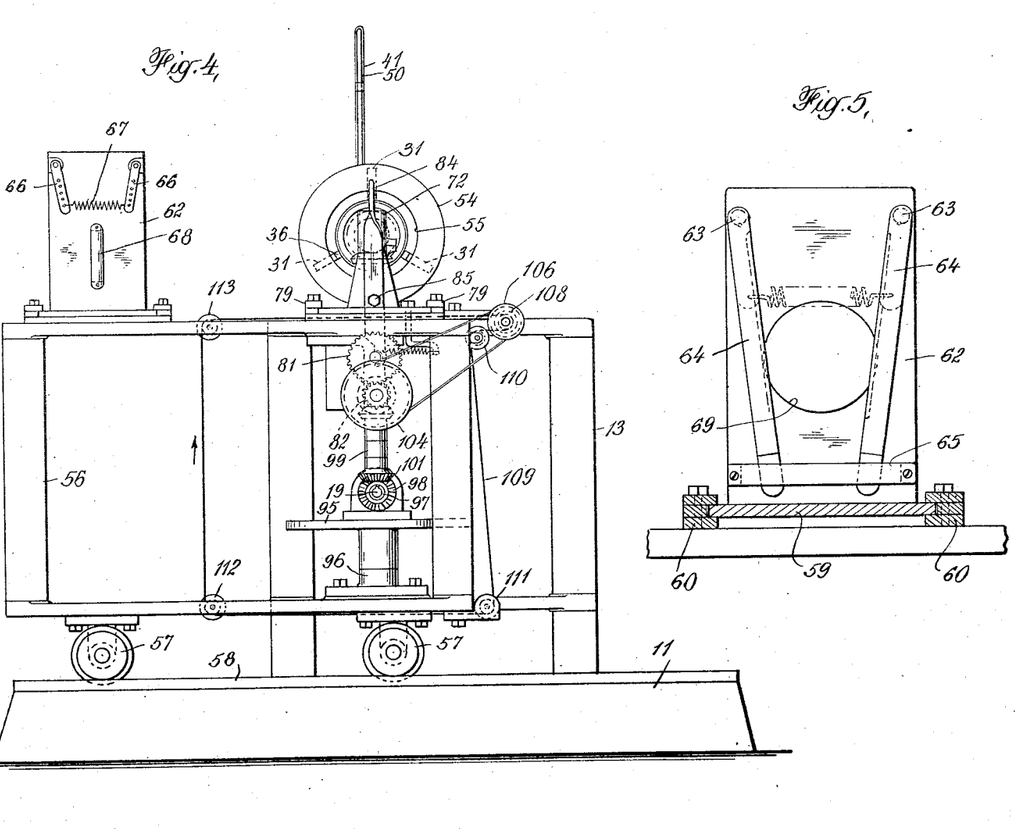
Fig. 4 is a side elevation of the machine, looking toward the left in Fig. 1, on the line 4—4 of Fig. 3.
Fig. 5 is a face view of the inserting device, taken on the line 5—5 of Fig. 2.
Figure 6:
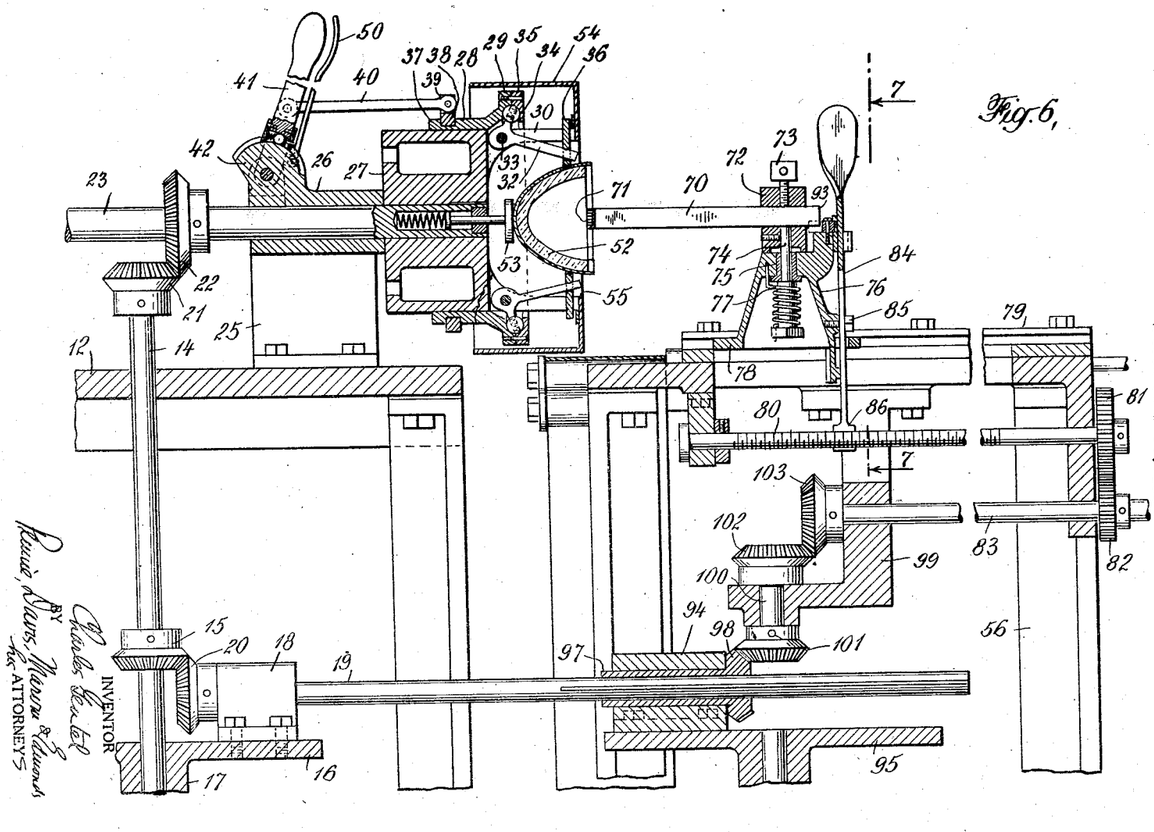
Fig. 6 is a vertical cross-sectional view of the machine on the line 6—6 of Fig. 3.
Figure 7:
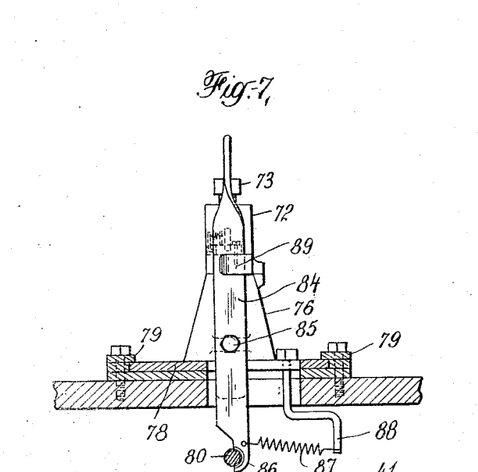
Fig. 7 is a vertical cross-sectional view of a portion of the machine taken on the line 7—7 of Fig. 6, Figs. 8 and 9 are plan views, partly in section, showing the tool holding means and the latching device, Fig. 8 showing the latching device in operative position, and Fig. 9 showing it in inoperative position.
Figure 8:
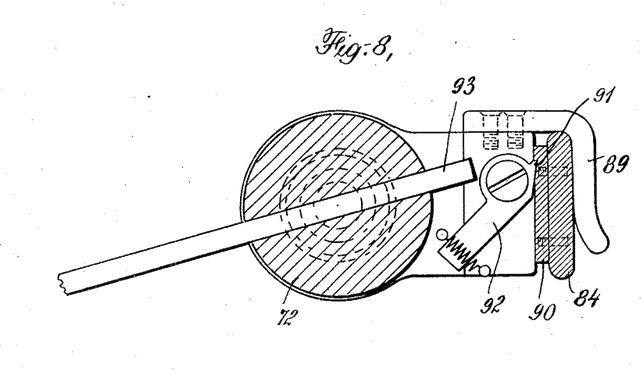
Figure 10:
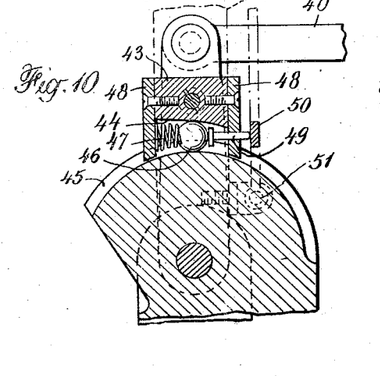
Fig. 10 is an enlarged detail of a clutching device associated with the nut holding mechanism.

At one end the shaft carries a chuck which is composed of a casting 27 secured to the shaft and rotatable therewith, and a ring 28 enclosing a portion of the circumference of the casting and having a flanged end 29 extending therebeyond. Projecting beyond the outer face of the casting 27 is a circular flange 30 having slots 31 formed in it in spaced relation. These slots are illustrated in Fig. 4 as being three in number, and lying within each slot is a bell crank lever 32, pivoted in position at 33. The shorter upper arm of the bell crank carries a ball 34 which is gripped within a socket formed partly in the end of the flange 29 and partly in a plate 35 bolted to the face of this flange and serving to hold the ball firmly in position within its socket. At the outer end the bell crank passes through an aperture formed in a gripping jaw 36, the inner end of which is formed with suitable teeth. This jaw extends through the slot 31 and is movable in and out as the bell crank is rocked on its pivot. For this purpose the flanged ring 28 is movable in the direction of the axis of the shaft 23 and has a peripheral channel 37 in which lies a ring 38. The ring has a lug 39 to which is secured one end of a link 40, the other end of which is secured to a handle 41 pivoted on a lug 42 formed on the cap 26. The handle 41 carries a plate 43 which has a curved under surface 44, this surface cooperating with a groove 45 which extends on the arc of a circle around the lug 42. Lying in this groove is a ball 46 which is held by a spring 47 against the right-hand end of the curved surface 44, as seen in Fig. 10. A pair of plates 48, 48, secured to either face of the plate 43, afford a means by which the ball may be introduced in position, and a plunger 49 extends through one of these plates and is so positioned that its rear end may be engaged by a pivotally mounted handle 50 attached to the handle 41 at 51. The ball, groove and plate 43 provide a locking device of a well-known type and when the handle 41 is rocked to the right, as shown in Fig. 6, it causes the gripping jaws 36 to move inwardly along radial paths and to engage the nut 52. When these jaws have gripped the nut in the desired manner the handle 41 is rocked to the left slightly, when the ball will be wedged between the surface of the groove 45 and the curved surface 44 on the plate 43. This will serve to lock the jaws in operative position. When the jaws are to be released the handle 50 is moved slightly, forcing the plunger 49 inwardly so as to force the ball away from its wedged position. This handle is kept in such position as to keep the ball free from the wedging surface so long as a free movement of the handle 41 is desired. Upon release of the handle 50 the ball-locking device automatically becomes operative.

The nut 52 is a portion of a coconut cut so as to have an open end, and is preferably half a coconut. This half coconut is held in position by the gripping jaws 36 and when being inserted in position to be seized by these jaws, its rounded end bears against a spring-pressed plunger 53 which is mounted in a recess formed in the end of the shaft 23. Mounted on the end of the flange 30 is a screen 54 having an aperture 55 in its front face, through which the nut is inserted into the chuck. This screen encloses the various parts of the chuck, as illustrated.

Movable past the table 12 is a carriage 56 which has suitable wheels 57 running on rails 58 on the bed plate 11. On this carriage is supported the device by which the nuts are inserted in the chuck and also the tool by which the meat is extracted from the nuts, and the mechanism which drives the tool. The device by which the nuts are inserted in place in the chuck consists of a plate 59, movable in suitable guideways 60, 60, mounted on the upper bed 61 of the carriage. On this plate 59 is an upright plate 62, and extending through the plate 62, near the upper corners thereof, are pins 63. Extending downwardly across the front face of the plate are arms 64 the lower ends of which are guided by means of a rail 65 secured at either edge of the plate 62. On the rear face of the plate there are secured to the pins shorter arms 66, between which is mounted a spring 67, tending to draw the arms together. Also on the rear face of the plate 62 is a handle 68 by which the device may be moved to and from the chuck. On the front face of the plate 62 is an index 69, by which the position in which the nut is to be placed is approximately indicated to the operator. When the half nut is to be inserted in the chuck it is placed with its open end lying against the face of the plate 62 by moving it downwardly between the arms 64 to the appropirate position, thus spreading these arms against the spring and causing the nut to be held firmly between them. The plate 62 is then moved up toward the chuck until the rounded end of the nut bears against the spring-pressed plunger 53. With the nut in this position the handle 41 is operated to cause the gripping jaws to grip the nut and the inserting device may then be moved backwardly away from the chuck by the handle 68.

Figure 3:
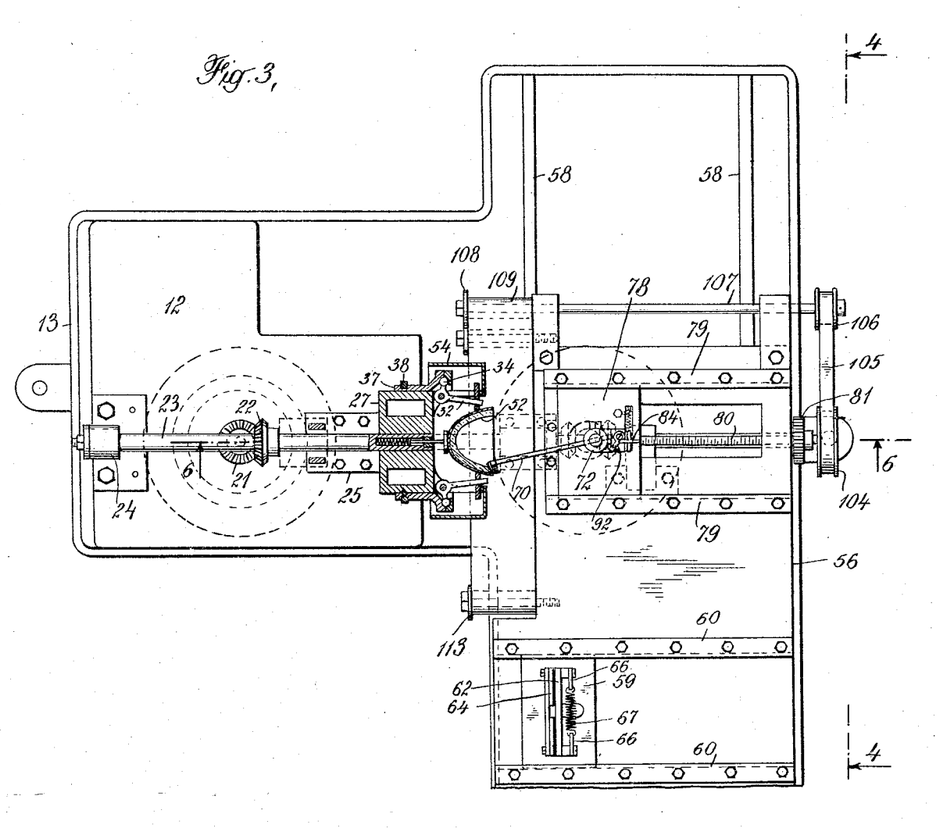
Fig. 3 is a similar top plan view showing certain parts in section and with various other parts in altered relation and occupying the positions assumed during the extracting operation.
Figure 9:
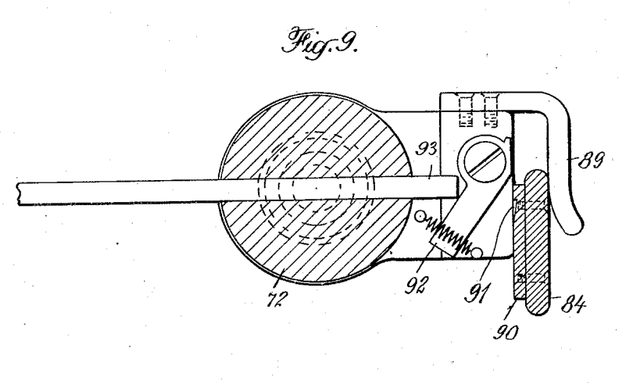

The tool by which the meat is extracted from the nut is indicated at 70, and at its forward end has a plurality of cutting edges 71 so arranged as to produce shreds of the desired shape and size. The knife that I prefer to use is one similar to that illustrated in the patent of George D. Olds, Jr., No. 1,438,714, which has a plurality of vertical and transverse cutting edges which produce clean shreds of the desired size. The shank of the tool is secured in a holder 72 by means of a set screw 73. The holder is fast on a pin 74, which extends through a bearing 75 in a standard 76. At its lower end the pin 74 is encircled by a spring 77 secured at one end to the pin and at the other to the standard. This spring is so arranged as to cause the forward end of the tool to be held with a yielding engagement against the inner wall of the nut, as illustrated more clearly in Fig. 3, and as shown in that figure the tool is biassed so as to swing in a counter-clockwise direction. The standard 76 is mounted on a plate 78, movable in guideways 79, 79, on the top plate of the carriage 56. Mounted in the carriage below these guideways is a screw 80, supported in suitable brackets. This screw carries a gear 81 at its outer end which meshes with the gear 82 on a shaft 83, which is driven by a driving connection, presently to be described, and an arm 84 pivotally mounted at 85 on the standard 76, carries a half nut 86 at its lower end, which is adapted to be held in engagement with the threads on the screw 80. The screw 80 is so driven that when the half nut is held in contact therewith the plate 78 and the standard constituting a carriage for the tool holder, will be moved so as to cause the tool to advance into the nutshell. The arm 84 is normally biassed so that the half nut is out of engagement with the screw threads, by a spring 87 secured at one end to the lower end of the arm 84 and at its other end to a stationary bracket 88 secured to the carriage. At its upper end, the arm 84 is received in a guide finger 89, bolted to the bracket, and the arm 84 carries a plate 90, having a socket 91 formed on its inner face. A spring-held dog 92 is mounted on the standard 76 in such a position that when the arm 84 is swung so that the half nut engages the threads on the screw 80 the dog will lock the arm in this position. The rear end of the dog is so positioned that it may be engaged by the rear end 93 of the tool and the relation of the parts is such that as the tool enters the nut more and more deeply in the operation of extracting the meat the tool will be swung by the curvature of the inner wall of the nut until eventually at a predetermined point in the travel of the tool its rear end will strike the tail of the dog 92 and swing it to the position indicated in Fig. 9. This dog then releases the arm 84 and the spring 87 on the latter forces it away from the screw 80 thus interrupting the travel of the carriage on which the tool and its holder are mounted. This arrangement, therefore, provides a device by which the extracting operation may be carried on automatically. When the portion of the coconut is in place within the chuck the arm 84 is swung so that a driving connection is established between the screw 80 and the carriage on which the tool and its holder are mounted. As the coconut is rotated by the chuck the tool is advanced farther and farther into the open end, thus extracting the meat in the form of fine shreds. As the tool follows the curvature of the inner wall of the nut with which it is held in yielding engagement by the spring 77, the tool is swung about a vertical axis and by properly designing the parts the tool will be swung sufficiently to move the dog 92 to release the arm 84 when the bottom of the nut has been reached. The curvature of the nut, therefore, is taken advantage of in interrupting the travel of the tool, and by this mechanism the extracting operation is carried on without attention on the part of the operator, and is automatically interrupted when the contents of the nutshell has been removed.

Figure 1:
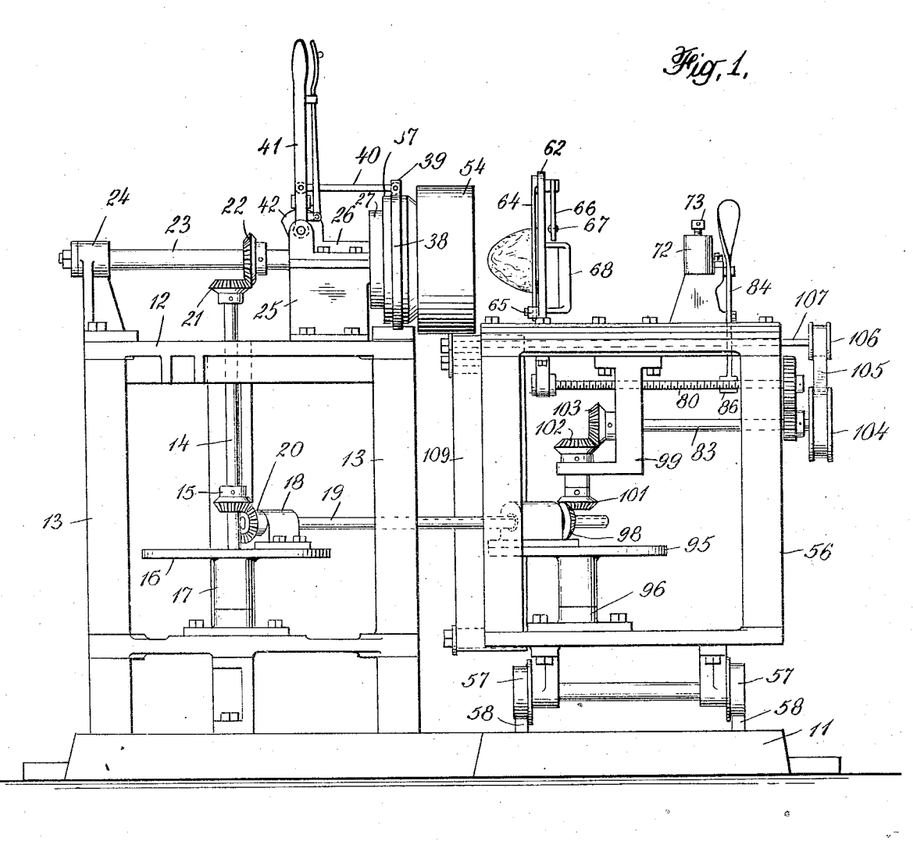
Fig. 1 is a view of a machine in end elevation.
Figure 2:
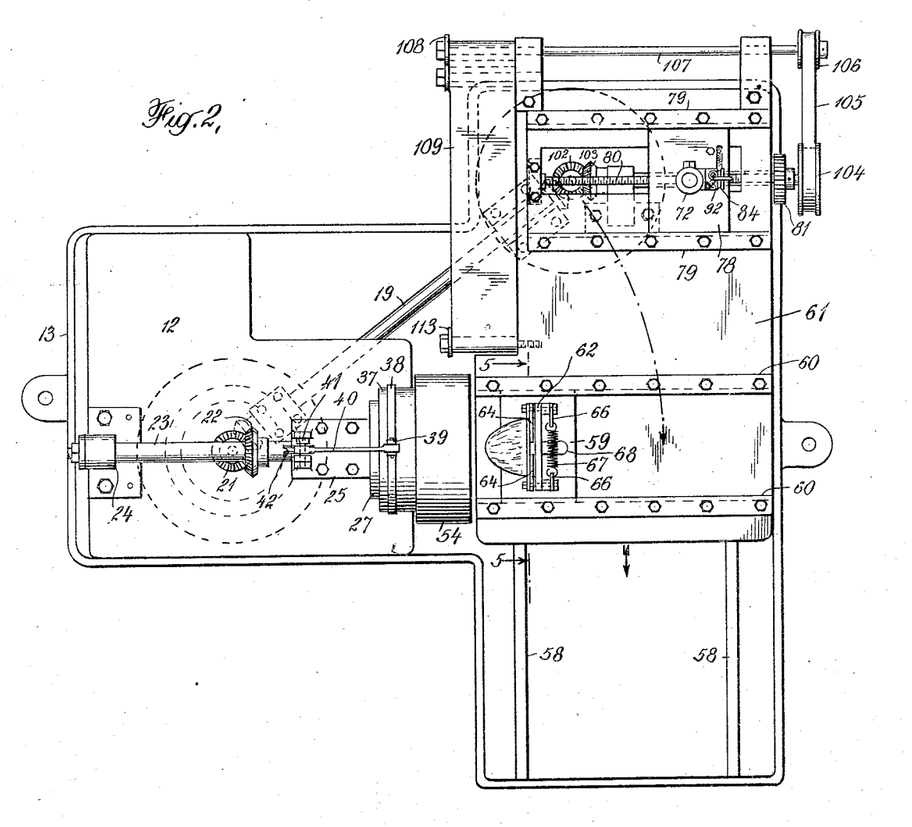
Fig. 2 is a top plan view of this machine.

The mechanism for driving the screw 80 consists of the shaft 19 previously mentioned. This shaft extends through a bearing 94 which is mounted on a disc 95, pivotally supported in suitable bearings 96 on a cross member or carriage 56. Encircling this shaft is the hub 97 of a bevel gear 98 which is splined to the shaft and movable along it while being continuously driven thereby. Mounted in a suitable L-shaped bracket 99, depending from the upper bed plate of the carriage 56, is a short vertical shaft 100 which carries a bevel gear 101 at its lower end meshing with the bevel gear 98. The vertical shaft 100 lies in the axis of rotation of the plate 95 so that the main carriage 56 may be moved along its tracks 58 without interfering with the driving connection between the shaft 100 and the shaft 19. As the carriage moves from the position shown in Fig. 2 to that shown in Fig. 3, the bearing 94 moves about the arc of a circle by the rotation of the plate 95. The shaft 19 swings about the vertical shaft 14 to the center and the gear 98 rolls around the gear 100. Thus the shaft 100 is continuously driven from the main drive shaft 14, regardless of the position of the carriage. At its upper end the shaft 100 carries a bevel gear 102, meshing with a similar gear 103 on the shaft 83, and with this arrangement the screw 80 is continuously driven from the main drive shaft 14 of the machine, regardless of the position of the carriage 56, but the secondary carriage on which the tool and its holder are mounted is only driven from the screw 80 when the arm 84 is swung to establish a driving connection with the screw 80.

Mounted on the outer end of the shaft 83 is a pulley 104 over which runs a belt 105, driving a pulley 106 on the shaft 107. This shaft extends across the carriage and carries a pulley 108 over which runs a wide belt 109. From the pulley 108 the belt travels around an idler pulley 110 placed somewhat to the rear of the pulley 108, then downwardly over an idler pulley 111, below the pulley 110, then to the rear over another idler pulley 112, upwardly to another idler pulley 113, and then across parallel to the top plate of the carriage to the pulley 108. The belt 109 provides a conveyor by which the shredded meat extracted from the coconut may be discharged from the machine, and as this meat drops from the shell and falls on the belt 109, it is conveyed toward the pulley 108 beneath which may be placed a receptacle into which it is discharged. The idler pulley 110 placed to the rear of the pulley 108, permits the meat to be discharged vertically over the face of the pulley into the receptacle.

In operating the machine a half coconut, produced by suitable cutting devices, is placed with its open end against the face of the plate 62 of the inserting mechanism. The carriage 56 has meantime been placed so that this inserting mechanism is in registry with the chuck. The inserting device, with the coconut held against its face by the spring-held arm 64, is then moved toward the chuck until the curved end of the coconut bears against the spring-held plunger within the chuck. The coconut is thus properly inserted and centered within the chuck and the handle 41 is next operated to cause the gripping jaws to seize the nut. When this operation is completed the inserting device is moved to the rear and the carriage moved along its rails to bring the secondary carriage on which the tool and tool holder are placed, into registry with the open end of the nut. The secondary carriage is moved so that the tool is in proper relation with the nut and the arm 84 is swung by its handle to cause the half nut on its lower end to engage with the driven screw 80. The power is now thrown on and the chuck rotates the nut relative to the tool, causing the latter to carry on its shredding and cutting operation. At the same time, the carriage on which the tool and holder are mounted, is continuously advanced toward the open end of the nut so that the tool enters farther and farther into the nut as the shredding operation continues. During this movement the tool swings about a vertical axis as it follows the curvature of the inner wall of the nut, until eventually, when it is swung to the desired extent its rear end strikes the dog 92 and swings it so as to release the arm 84. The latter is then swung by its spring so as to be disengaged from the screw 80, whereupon no further advance of the carriage takes place. When this point is reached the stopping of the carriage indicates to the operator that a new nut must be placed in position. He then stops the machine, moves the tool carriage to the rear, releases the old nut from the chuck and inserts a new one in position by the devices provided for the purpose. While the shredding operation is being carried on the nut meat extracted is deposited on the conveyor belt and delivered at one side of the machine into suitable receptacles. The shredded meat is removed from time to time and put up in packages in the usual way.

I claim:

1. In a machine for extracting coconut meat, the combination of a holder for a portion of the nut having an open end, a tool for extracting the meat from the nut-shell, means for holding the tool in yielding engagement with the inner wall of the shell, means for causing a relative movement of rotation and a relative movement of translation of the nut and the tool, and means operable by the swinging movement of the tool as it follows the curvature of the wall of the shell, for stopping the relative movement of translation at a predetermined point.

2. In a machine for extracting coconut meat, the combination of a holder for a portion of the nut having an open end, a tool for extracting the meat from the nut-shell, means for holding the tool in yielding engagement with the inner wall of the shell, means for causing a relative movement of rotation of the nut and the tool, means for causing a relative movement of translation of the nut and the tool, such that the tool advances into the nut, and means operable by the swinging movement of the tool as it follows the curvature of the wall of the shell during the said relative movement of translation, for stopping that movement at a predetermined point.

3. In a machine for extracting coconut meat, the combination of a holder for a portion of the nut having an open end, a tool for extracting the meat from the nut-shell, means for holding the tool in yielding engagement with the inner wall of the shell, means for rotating the holder, means for moving the holder and tool relatively to cause the tool to advance into the nut and means operable by the swinging movement of the tool as it follows the curvature of the wall of the shell, for rendering the said moving means inoperative at a predetermined point.

4. In a machine for extracting coconut meat, the combination of a holder for a portion of the nut having an open end, a tool for extracting the meat from the nut-shell, means for holding the tool in yielding engagement with the inner wall of the shell, means for causing a relative movement of rotation of the nut and the tool, means for causing a relative movement of translation of the nut and the tool, and means for locking the means last mentioned in operative position, the said means being releasable by the swinging movement of the tool as it follows the curvature of the wall of the shell.

5. In a machine for extracting coconut meat, the combination of a holder for a portion of the nut having an open end, a tool for extracting the meat from the nut-shell, a holder for the tool adapted to hold the tool in yielding engagement with the inner wall of the shell, means for causing a relative movement of rotation of the nut and the tool, means for causing a relative movement of translation of the nut and the tool, and a latch device for maintaining the means last mentioned operative and releasable by the swinging movement of the tool as it follows the curvature of the wall of the shell to permit the said means to become inoperative.

6. In a machine for extracting coconut meat, the combination of a holder for a portion of the nut having an open end, a tool for extracting the meat from the nut-shell, means for holding the tool in yielding engagement with the inner wall of the shell, means for causing a relative movement of rotation of the nut and the tool, means biased toward inoperative position for causing a relative movement of translation of the nut and the tool, and means for locking the means last mentioned in operative position and actuated by the tool in its swinging movement as it follows the inner wall of the shell, to release the said means.

7. In a machine for extracting coconut meat, the combination of a holder for a portion of the nut having an open end, a tool for extracting the meat from the nut-shell, means for holding the tool in yielding engagement with the inner wall of the shell, means for causing a relative movement of rotation of the nut and the tool, a carriage on which the tool and its holding means are mounted and movable toward and away from the open end of the nut, means for moving the carriage, and means operable by the swinging movement of the tool as it follows the inner wall of the shell for rendering the moving means inoperative.

8. In a machine for extracting coconut meat, the combination of a holder for a portion of the nut having an open end, a tool for extracting the meat from the nut-shell, means for holding the tool in yielding engagement with the inner wall of the shell, means for causing a relative movement of rotation of the nut and the tool, a carriage on which the tool and its holding means are mounted and movable toward and away from the open end of the nut, means for moving the carriage, means for operatively connecting the carriage and the moving means and means operable by the swinging movement of the tool as it follows the inner wall of the shell for rendering the connecting means inoperative.

9. In a machine for extracting coconut meat, the combination of a holder for a portion of the nut having an open end, a tool for extracting the meat from the nut-shell, a tool holder adapted to hold the tool in yielding engagement with the inner wall of the shell, means for causing a relative movement of rotation of the nut and the tool, a carriage on which the tool holder is mounted, movable toward and away from the open end of the nut, a power-driven screw, an arm on the carriage movable to engage the screw whereby the carriage is advanced toward the nut by the screw, and means operable by the swinging movement of the tool as it follows the curvature of the shell wall, for releasing the operative connection of the arm and the screw to stop the travel of the carriage.

10. In a machine for extracting coconut meat, the combination of a holder for a portion of the nut having an open end, a tool for extracting the meat from the nut-shell, a tool holder adapted to hold the tool in yielding engagement with the inner wall of the shell, means for causing a relative movement of rotation of the nut and the tool, a carriage on which the tool holder is mounted, movable toward and away from the open end of the nut, a power-driven screw, a spring pressed arm movable to engage the screw whereby the carriage is advanced toward the nut by the screw, and a latch device operable to hold the arm and screw in engagement and actuated by the swinging movement of the tool as it follows the curvature of the shell wall, to release the arm from the screw to stop the travel of the carriage.

11. In a machine for extracting coconut meat, the combination of a power driven rotary holding device for a portion of the nut having an open end, means for inserting the portion of the nut in this device, a tool for extracting the meat from the nut-shell, means for holding the tool in yielding engagement with the inner wall of the nut-shell, a carriage on which the inserting means and tool holding means are mounted in spaced relation, this carriage being movable past the holding device to bring either of these means into registry therewith, means for driving the holding device, and means continuously connected therewith regardless of the position of the carriage and operable to advance the tool into the nut-shell.

12. In a machine for extracting coconut meat, the combination of a power driven rotary holding device for a portion of the nut having an open end, means for inserting the portion of the nut in this device, a tool for extracting the meat from the nut-shell, means for holding the tool in yielding engagement with the inner wall of the nut-shell, a carriage on which the inserting means and tool holding means are mounted in spaced relation, this carriage being movable past the holding device to bring either of these means into registry therewith, means for driving the holding device, means on the carriage continuously connected with said driving means regardless of the position of the carriage and operable through a clutch device to advance the tool into the nut-shell, and means actuated by the swinging movement of the tool for releasing said clutch device.

13. In a machine for extracting coconut meat, the combination of a holder for a portion of the nut having an open end, means for inserting the portion of the nut in the holder, a tool for extracting the meat from the nut-shell and a carriage on which the tool and the inserting means are mounted; the carriage being movable to bring either one into registry with the holder.

14. In a machine for extracting coconut meat, the combination of a holder for a portion of the nut having an open end, means for inserting the portion of the nut in the holder, a tool for extracting the meat from the nut-shell, a holder for the tool adapted to hold the latter in engagement with the inner wall of the shell, a carriage on which the tool holder and the inserting means are mounted, this carriage being movable past the nut holder to bring the tool and the inserting means successively into registry therewith, means for producing a relative movement of rotation of the tool and the nut, and means for producing a relative movement of translation of the tool and the nut to advance the tool into the nut-shell.

15. In a machine for extracting coconut meat, the combination of a holder for a portion of the nut having an open end, means for inserting the portion of the nut in the holder, a tool for extracting the meat from the nutshell, a holder for the tool adapted to hold the latter in engagement with the inner wall of the shell, a carriage on which the tool holder and the inserting means are mounted, this carriage being movable past the nut holder to bring the tool and the inserting means successively into registry therewith, means for producing a relative movement of rotation of the tool and the nut, means on the carriage for advancing the tool into the nut, and clutch mechanism for controlling the action of the means last mentioned, this clutch mechanism being releasable at a predetermined point by the swinging movement of the tool as the latter follows the curvature of the inner wall of the shell.

16. In a machine for extracting coconut meat, the combination of a holder for a portion of the nut having an open end, means for rotating this holder, means for inserting the portion of the nut in the holder, a tool for extracting the meat from the nutshell, a holder for the tool adapted to hold the latter in engagement with the inner wall of the shell, a carriage on which the tool holder is mounted, a main carriage on which the nut-inserting means and the tool holder carriage are mounted, this main carriage being movable past the nut holder to bring the tool and the inserting means successively into registry therewith, means on the main carriage for moving the tool holder carriage toward the nut, this moving means being continuously driven from the nut holder rotating means, regardless of the position of the carriage, means for operatively connecting the tool holder carriage and the moving means therefor, and means operable by the swinging movement of the tool as it follows the curvature of the inner wall of the shell for rendering the said connection inoperative.

17. In a machine for extracting coconut meat, the combination of a rotary chuck having a plurality of gripping jaws, means for inserting a portion of a nut having an open end in this chuck, a main carriage on which the inserting means is mounted, a tool for extracting the meat from the nutshell, a holder for the tool adapted to hold the latter in engagement with the inner wall of the shell, a secondary carriage on which the tool holder is mounted, means for rotating the chuck, means on the carriage for moving the secondary carriage toward the open end of the nut, this means being connected with the driving means for the chuck, regardless of the position of the carriage, and a clutch device for connecting the secondary carriage and the moving means therefor, this clutch device being releasable at a predetermined point by the swinging movement of the tool as the latter follows the curvature of the inner wall of the nut.

18. In a machine for extracting coconut meat, the combination of a rotary chuck having a plurality of gripping jaws adapted to hold a portion of the nut having an open end, a main carriage movable past the chuck, means on the main carriage for inserting the portion of the nut in the chuck, a tool for extracting the meat from the nutshell, a holder for the tool adapted to hold the latter in engagement with the inner wall of the shell, a secondary carriage movable on the main carriage and supporting the tool holder, means for driving the chuck, a screw on the main carriage adapted to move the secondary carriage toward the open end of the nut, means for driving this screw from the chuck-driving means, regardless of the position of the carriage, and a driving connection between the secondary carriage and the screw releasable by the swinging movement of the tool as it follows the curvature of the inner wall of the nut for rendering the driving connection inoperative at a predetermined point.

19. In a machine for extracting coconut meat, the combination of a driving shaft, a chuck driven thereby and having gripping jaws adapted to hold a portion of the nut having an open end, a carriage movable past the chuck, means on the carriage for inserting the portion of the nut in the chuck, a tool for extracting the meat from the nutshell, a tool holder adapted to hold the tool in engagement with the inner wall of the shell, a secondary carriage on which the tool holder is mounted, this secondary carriage being mounted on the carriage first mentioned, in spaced relation to the inserting means, means on the main carriage for advancing the secondary carriage toward the chuck, a shaft driven from the shaft first mentioned and adapted to be swung about the latter as a center, whereby the driving connection is maintained, and means for driving the moving means for the secondary carriage from this latter shaft.

20. In a machine for extracting coconut meat, the combination of a driving shaft, a chuck driven thereby and having gripping jaws adapted to hold a portion of the nut having an open end, a carriage movable past the chuck, means on the carriage for inserting the portion of the nut in the chuck, a tool for extracting the meat from the nutshell, a tool holder adapted to hold the tool in engagement with the inner wall of the shell, a secondary carriage on which the tool holder is mounted, this secondary carriage being mounted on the carriage first mentioned, in spaced relation to the inserting means, means on the main carriage for advancing the secondary carriage toward the chuck, a shaft driven from the shaft first mentioned and adapted to be swung about the latter as a center, whereby the driving connection is maintained, means for driving the moving means for the secondary carriage from this latter shaft, and conveying means on the carriage for removing the extracted meat.

21. In a machine of the class described, the combination of a rotary chuck, comprising a body member, a plurality of jaws mounted thereon in spaced relation about an axis, means on the body for simultaneously moving the jaws inwardly and outwardly in radial directions, and means for inserting a portion of the nut having an open end within the chuck, and including a plate and a pair of spring-held arms for holding the open end of the portion of the nut against said plate.

22. In a machine of the class described, the combination of a rotary chuck comprising a body member, a plurality of bell cranks pivotally mounted on the body in spaced relation, a jaw operatively connected with each bell crank, means for simultaneously actuating the bell cranks to cause the jaws to move inwardly and outwardly in radial directions, and a spring-held plunger within the body portion serving as a seat for the nut, and means for inserting the nut in the chuck including a plate and a pair of spring-held arms mounted to swing across the face of the plate and operable to hold a portion of the nut having an open end with its open end against the plate.

23. In a machine of the class described, the combination of a rotary chuck for holding a portion of the nut having an open end, comprising a plurality of spaced gripping jaws movable inwardly and outwardly in radial directions with relation to an axis, means for opening and closing the jaws, and means for locking the jaws in position, a tool, means for holding the tool in yielding engagement with the inner wall of the nut held in the chuck, means for advancing the tool into the nut, and means operable by the swinging movement of the tool as it follows the curvature of the inner wall of the nut for rendering the moving means inoperative.

24. In a machine for extracting coconut meat, a device for holding and rotating a portion of a coconut having an open end, which comprises the combination of a rotatable shaft, a body member mounted on the shaft adjacent one end and provided with a circular flange on its outer end, a plurality of radially movable gripping jaws mounted in the flange in the body member, bell-crank levers pivoted in the body member, each lever being operatively connected to one of the jaws, a ring slidable along the body member and operatively connected to the bell-crank levers to swing the latter, and a spring-pressed plunger disposed in the end of the shaft and forming a seat for the end of the portion of the nut held by the gripping jaws.

In testimony whereof I affix my signature.

CHARLES H. GENTEL.